United States Patent Office 3,302,717
Patented Feb. 7, 1967

3,302,717
SELECTIVE PLUGGING OF SUBTERRANEAN FORMATIONS TO INHIBIT INTRUSION OF WATER
Samuel R. West, Evansville, Ind., and Francis E. Dollarhide, Tulsa, Okla., assignors to The Dow Chemical Company, Midland, Mich., a corporation of Delaware
No Drawing. Filed Dec. 26, 1961, Ser. No. 162,185
5 Claims. (Cl. 166—33)

The invention is concerned with the treatment of subterranean formations penetrated by a well. It is particularly concerned with such treatment wherein the purpose is to inhibit the intrusion, influx, or encroachment of water into oil-producing strata in such formations.

Water and more usually brine often exist in the same subterranean formation as petroleum. Therefore, in the production of petroleum, water or brine is often also produced and frequently in such large amounts as to present a vexing problem. The presence of brine or water in the petroleum results in a number of problems: it directly or indirectly causes obstructing deposits in the vicinity of the wellbore or in the tubing of the well; it encourages markedly the corrosion of tubing and other well equipment employed in the production, storage and transfer of petroleum; it requires unnecessarily large quantities of liquid to be pumped from the well, stored, and handled, a large part of which has no economic value; it forms oil and brine emulsions which are extremely tight and difficult to break and which cause plugging in the formation known as water blocks thereby inhibiting the free flow of fluids to the wellbore; emulsions ultimately require the separation of the thus emulsified oil and brine or water entailing considerable expense, inconvenience, and delay; the separated brine requires the disposal thereof which in turn gives rise to the need for obtaining and caring for suitable areas or sites for such disposal, such areas usually being large acreages that become substantially barren as a result of the action of the brine. The production of brine and/or water along with petroleum being produced is therefore a natural condition commonly existing in oil producing formations from which alleviation is sought.

In addition to the problem of water intrusion into oil-producing strata as a result of natural causes in the formation, hydraulic fracturing of formations penetrated by a well to produce fissures and cracks therein to increase the flow of water therefrom increases the extent and severity of the water intrusion problem. Although undesirable, such increase is unavoidable, at least to some extent, because no effective means or method is known to restrict or limit the cracks and fissures, produced during the fracturing operation, to the oil-producing horizons and thereby prevent their extension to adjacent water zones. Particularly serious are the more-or-less vertical fractures frequently formed during fracturing which provide communication between oil and water strata lying superjacent or subjacent to each other.

The need for a satisfactory method of preventing or inhibiting the encroachment or intrusion of native brine and/or water into oil-bearing strata has long existed in the production of petroleum. Many attempts have been made to block off selectively the intrusion of the water or brine without appreciably stopping the flow of petroleum to the wellbore. However, such attempts have heretofore not been fully satisfactory.

The need for a more effective method of inhibiting the intrusion of the water, therefore, still continues. It is the principal object of the invention to meet this need. A further object of this invention is to meet the need for a method of inhibiting intrusion of water which is useful particularly in strata wherein elevated temperatures prevail. The method and means by which these needs are met is made clear in the ensuing description and is particularly defined in the appended claims.

The invention, broadly, comprises admixing with an oil-base fracturing liquid, a polyacrylamide polymer which is substantially insoluble in water but which is swellable upon contact with water and not swellable upon contact with a petroleum oil and injecting the oil-base composition containing the polymer down a well penetrating oil- or gas-bearing strata and back into the formation where at least a portion of the polymer remains so located that waters present or entering the oil-producing strata, will come in contact with the polymer and thereby be immobilized and inhibited from further intrusion into the oil- or gas-bearing strata. The invention is particularly applicable as an improved well-fracturing operation wherein the polymer is dispersed in an oil-base fracturing liquid, the liquid-polymer dispersion so made injected into the well at fracturing pressures, and at least a portion of the polymer forced into and deposited in newly formed fractures.

The liquid employed may be an oil-base liquid, e.g., crude oil, gas oil, diesel oil, or kerosene, or an oil-water emulsion, gelled oil, or an oil containing a thickening or colloid-producing agent.

A particularly effective fracturing fluid for use in the practice of the invention is crude oil such as oil which has earlier been produced from the well, or other crude oil; refined and semi-refined oils are also effective. Oil base fracturing compositions which contain only minor amounts of water are satisfactory fracturing fluids for carrying out the invention. For example, a gelled fluid prepared according to the teaching of U.S. Patent No. 2,914,476, by admixing an oil, for example, crude oil or kerosene with an aqueous solution of sodium hydroxide and a mixture of relatively long carbon chain fatty acids is satisfactory. The following recipe is illustrative of such a fracturing liquid: 1,000 parts by volume of crude oil, 15 parts by volume of a 30% by weight aqueous solution of NaOH, and 7.5 parts by volume of a mixture of about 85% by volume of tall oil and 15% by volume of octanoic acid.

A polyacrylamide polymer satisfactory for use according to this invention is the product of copolymerization of acrylamide with N,N'-methylene-bis-acrylamide using amounts and conditions such that the resulting polymer is cross-linked to a limited degree. The limited cross-linked polymer effective in accordance with this invention, is sufficiently cross-linked to be insoluble in water and in brines, but retains the ability to swell in such aqueous media. The polymerization process to produce a polymer of this mixture is commonly carried out by heating in an aqueous system acrylamide containing about 300 to 5,000 parts per million by weight of N,N'-methylene-bis-acrylamide, although about 150 to 6,000 parts per million results in copolymers which are operable in accordance with my invention. Polymerization is effected using any of the usual water-soluble oxygen-containing catalysts, such as the ammonium, potassium and sodium persulfates, hydrogen peroxide or an organic hydroperoxide, or the alkali metal and ammonium chlorates and the like. It is generally desirable to use a redox catalyst system of an oxygen-containing compound with a reducing agent such as sodium thiosulfate, sodium or potassium bisulfite or metabisulfite, according to known methods. The polymer product is dried as on a drum drier and is ground to a particle-size of preferably about 95% through a 20 mesh sieve and 100% retained on a 100 mesh sieve (sieves of the standard screen scale). Although N,N'-methylene-bis-acrylamide is a preferred and commercially available compound for use with acrylamide to produce a limited cross-linked copolymer, other alkylidene bisacrylamides are suitable; the suitable compounds may be generally characterized by the formula:

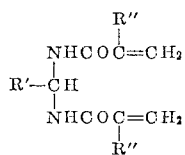

wherein

is a hydrocarbon residue of an aldehyde and R" is of the group consisting of hydrogen and the methyl radical.

Acrylamide is a preferred comonomer, although any ethylenic compound with a solubility of at least about 2% by weight and preferably at least about 5% in water and which copolymerizes with the alkylidene bisacrylamides in aqueous systems is satisfactory in producing a polymer operable in accordance with the invention.

Further satisfactory compounds for use as cross-linking agents to produce limited cross-linked copolymers with acrylamide in accordance with this invention include polyglycols, polyethyleneimines and aldehydes including formalin and glyoxal. These cross-linking agents may be used with acrylamide monomers and with linear polyacrylamide as by a procedure wherein about 15 parts by weight of the cross-linking agent are diluted with about 20 parts by weight of a mixture of approximately 75% of methanol and 25% by weight of water. The linear polyacrylamide is added to this mixture with stirring whereby the cross-linking agent is adsorbed by the polyacrylamide. The cross-linking reaction is usually complete after a period of about four hours at atmospheric temperatures. The solvent is removed by volatilization with the aid of heat such as by the use of a drum drying system and the resulting dry polymer is particulated to preferably about 20 to 100 mesh.

Another method for producing satisfactory limited cross-linked polyacrylamide polymers is by radiation polymerization of the acrylamide.

To illustrate polymers useful in the practice of the invention, limited cross-linked polyacrylamide polymers were prepared according to the earlier described technique utilizing N,N'-methylene-bis-acrylamide as a cross-linking agent, and employing various proportions of the N,N'-methylene-bis-acrylamide.

The polymers thus prepared were tested to determine the swelling characteristics in aqueous media as follows:

(1) About one gram of 100 mesh and larger particles of each polymer of known density were weighed to the nearest milligram. The volume was calculated from the weight and density.

(2) The weighed particles were immersed in a measured amount of each of the aqueous liquids set out in Table I below. The amounts of the liquids were more than sufficient to swell the particles.

(3) After immersion for 2 hours in the liquids, with agitation at ½ hour intervals, the particles were filtered from the excess liquids, the volume of the excess liquids measured, and the swollen volume of the particles ascertained.

(4) The volume ratio of dry polymer to polymer after immersion in the aqueous liquids was calculated as follows:

$$\frac{\text{Swollen volume}}{\text{Dry volume}} = \text{volume ratio}$$

Table I below shows the behavior of the polymers when prepared with varying amounts of cross-linking material, N,N'-methylene-bis-acrylamide, when immersed in aqueous media, water and brine.

*Table I*

| Run No. | Monomer | Parts Per Million N,N-Methylene-bis-Acrylamide Cross-Linking Agent | Behavior in Aqueous Media and Factor [1] by Which Volume of Polymer Swelled— | | Character of Polymer |
|---|---|---|---|---|---|
| | | | In Water | In Brine[2] | |
| 1 | Acrylamide | None | [3] | [3] | Linear. |
| 2 | do | 100 | [3] | [3] | Do. |
| 3 | do | 250 | 95 | 42 | Limited Cross-Linked. |
| 4 | do | 350 | 124 | 74 | Do. |
| 5 | do | 450 | 100 | 45 | Do. |
| 6 | do | 1,000 | 95 | 42 | Do. |
| 7 | do | 4,600 | 80 | 40 | Do. |

[1] Swollen volume divided by dry volume.
[2] Composed of 1.36% $MgCl_2$, 4.25% $CaCl_2$, 19.39% NaCl and 75% $H_2O$.
[3] Soluble.

Reference to Table I shows that those polymers prepared using lesser amounts of cross-linking agent were soluble in the aqueous media, those prepared using larger amounts were not soluble but were swollen and those prepared using increasingly larger amounts were swollen less by the aqueous media. Acrylamide when polymerized by the use of the redox catalyst as described earlier but without the presence of a cross-linking agent polymerizes to a linear water soluble monomer, as demonstrated by Run No. 1. The use of a small amount of cross-linking agent presumably creates a proportional amount of cross-linking in the resulting polymer, but as shown by reference to Run No. 2, Table I, the polymer is again soluble. The use of an increasing amount of a cross-linking agent, however, produces a polymer which is swollen by aqueous media through adsorption of the media; the resulting polymer is one which is no longer truly soluble in the media, yet it is not completely insoluble. The condition of cross-linking of polymerization responsible for this reaction is termed limited and in Table I, those polymers which are insoluble in water, but which respond to aqueous media by swelling through adsorption thereof are identified as limited cross-linked polymers. Reference to Table I shows that increasing amounts of cross-linking agent produce polymers which are less swollen, and the use of greater amounts of cross-linking agent results in polymers which are completely insoluble in aqueous media, in accordance with the known art of polymerization reactions.

Tests made according to the procedure used for determining the behavior in aqueous media for Table I were made also by exposing the limited cross-linked polymers to water and brine at boiling temperatures. It was determined that the polymers were swollen in like fashion and degree as indicated in Table I, wherein the data were obtained at atmospheric temperatures. From this it is clearly evident that the limited cross-linked polymers are satisfactory for use under the temperature conditions existing in the great majority of petroleum bearing wells.

Table II which follows shows the behavior when immersed in brine and water of polymers produced by the cross-linking action of certain cross-linking agents on liquid polyacrylamide polymers. Two varieties of linear polyacrylamide polymer were used; they are designated AP-30 and NP-10. These are polyacrylamides available from The Dow Chemical Company under the trademark "Separan." Separan AP-30 is a linear partially hydrolyzed polyacrylamide wherein 30% of the amide groups have been hydrolyzed. The degree of polymerization of AP-30 is such that a concentration of one-half percent by weight of the polymer in a 4% aqueous sodium chloride solution at a pH of 7 has a viscosity of 30 cps. Separan NP-10 has a viscosity of 10 cps. under like conditions, and is a non-hydrolyzed polymer.

before and after passing through the simulated fracture filled with the sand-polymer mixture and (2) the flow of liquid after contacting the polymer in the various sand-polymer mixtures were determined. A large drop between the pressure of the liquid before and after contacting the polymer in the sand-polymer mixture and a marked difference in flow of liquid from the sand-polymer mixture shortly after the liquid contacted the mixture showed a plugging effect, if any, caused by the liquid contacting the polymer. A test of this design is considered particularly severe since it is commonly believed that most fractures in earth formations are considerably less than one inch across, but rather about one-tenth inch or less and usually serpentine. Accordingly, the fractures in a for-

*Table II*

| Run No. | Identity of Linear Polyacrylamide | Cross-Linking Compound As Percent by Weight Of Linear Polyacrylamide | Reaction Media | Behavior in Aqueous Media and Factor [1] By Which Volume of Polymer Swelled— | | Character of Polymer |
|---|---|---|---|---|---|---|
| | | | | In Water | In Brine [2] | |
| 8 | AP-30 | 62.5% Polyethylene glycol Mol. Wt. 300 | Water | 40 | 10 | Limited Cross-Linked. |
| 9 | AP-30 | 83.5% Aminated Polypropylene glycol | do | 40 | 10 | Do. |
| 10 | AP-30 | 0.035% Formaldehyde | Methanol-Water | 59 | | Do. |
| 11 | AP-30 | 0.1% Formaldehyde | do | 68 | | Do. |
| 12 | AP-30 | 0.45% Formaldehyde | do | 24 | | Do. |
| 13 | AP-30 | 2% Formaldehyde | do | 10 | 2 | Highly Cross-Linked. |
| 14 | AP-30 | 0.03% Glyoxal | do | 70 | | Limited Cross-Linked. |
| 15 | AP-30 | 0.15% Glyoxal | do | 65 | | Do. |
| 16 | AP-30 | 1.2% Glyoxal | do | 51 | | Do. |
| 17 | AP-30 | 3% Glyoxal | do | 15 | 3 | Highly Cross-Linked. |
| 18 | AP-30 | Heat | do | 18 | 10 | Limited Cross-Linked. |
| 19 | NP-10 | do | do | 36 | 22 | Do. |

[1] Swollen volume divided by dry volume.
[2] Composed of 1.36% MgCl$_2$, 4.25% CaCl$_2$, 19.39% NaCl and 75% H$_2$O.

Reference to Table II shows that interaction of the polyacrylamides with the cross-linking compounds produced limited cross-linked polymers which were swollen when exposed to aqueous media by adsorption thereof. Runs 10 through 12 and 14 through 16 demonstrate the range of degree of cross-linking to produce polymers which are particularly susceptible to liquid adsorption and correspondingly maximum swelling. The polymers which exhibit a high degree of swelling are preferable, but those exhibiting lesser degrees are operable.

It is evident from Tables I and II that limited cross-linked polymers when contacted with water or with brine swelled in a most impressive manner. The thus swollen cross-linked polymers, being of a continuous solid phase, although susceptible to fluid movement to the extent necessary to absorb such fluid and become swollen thereby, are substantially impervious to the passage of water therethrough. Therefore, they are clearly satisfactory for plugging off interconnecting pores, channels, fractures, and similar narrow passageways through which water may move from the earth formations toward the well bore.

To show the effect of a limited cross-linked polymer on the passage of liquid through a constricting passageway containing the polymer, a series of tests was made using the product of the reaction of acrylamide with 4600 p.p.m. N,N'-methylene-bis-acrylamide as in Table I, Run No. 7. The tests were run by positioning vertically an elongated tube one foot in length and one inch in diameter and provided with an inlet line into the top and an outlet line from the bottom, each line being equipped with a pressure gauge. The tube was successively filled with mixtures of various ratios of the polyacrylamide cross-linked polymer and sand in the weight proportions set forth in Table III. The elongated tube simulated a subterranean fracture which was filled with a sand polymer mixture of this invention, following a fracture operation on an oil well. A brine solution consisting of (in terms of percent by weight) 1.36% MgCO$_3$, 4.25% CaCl$_2$, 19.39% NaCl and the balance water was forced vertically downwardly through the various sand-polymer mixtures in the vertical tube. Both (1) the difference in pressure of the liquid mation are more easily plugged. Table III following shows the results of the test runs.

*Table III*

| Run No. | Sand-Polymer Mixture in Weight Percent | | Pressure Gradient [1] in [2] p.s.i./foot of Sand—Polymer Column | Fluid Forced Through Sand—Polymer Column in [3] bbl./da./ft.[2] |
|---|---|---|---|---|
| | Sand | Polymer | | |
| 20 | 100 | 0 | 500 | 20,000 |
| 21 | 98 | 2 | 500 | 38 |
| 22 | 97 | 3 | 500 | 0.01 |
| 23 | 96 | 4 | 500 | None |
| 24 | 96 | 4 | 2,500 | None |

[1] Pressure gradient is differential in reading of the gauges in inlet line and outlet line.
[2] Pounds per square inch.
[3] Barrels per day per square foot.

Reference to Table III shows that brine in the absence of the polyacrylamide polymer prepared as required for use in the invention passes readily (Run No. 20) through the sand contained in the simulated fracture. On the other hand, as little as 2% of the polymer intermixed with 98% of the sand (Run No. 21) when exposed to brine according to the testing procedure set forth preceding Table III definitely decreases the permeability of the polymer-sand mixture as evidenced by the reduced flow of water therethrough. It further shows that when the precent of polymer is increased successively to 3 and 4% by weight of the polymer-sand mixture (Run Nos. 22 and 23) that the permeability is further decreased as evidenced by a decrease in the flow of brine through the polymer-sand mixture. Increasing the pressure gradient by a multiple of five (Run No. 24) over that of the preceding run was not sufficient to cause a breakthrough of the brine demonstrating clearly the complete shutoff of the permeability of the sand-polymer mixture in accordance with this invention.

The preferred embodiment of the invention, employing a polymer prepared by one of the above procedures and which, accordingly, has swelling and plugging properties when contacted by water, as demonstrated above, is carried out, broadly, by fracturing a formation employing well-known techniques, e.g., that set out in general language in Farris Reissue Patent No. 23,733, except that the fracturing liquid used in accordance with the invention contains between about 10 and about 400 pounds and more usually between 40 and 200 pounds of polymer per 1000 gallons of fracturing liquid. The preferred practice of the invention employs between about 500 and 5000 pounds of propping agent, often flint shot sand, of between about 10 to 60 mesh, and usually between 20 and 40 mesh size, per 1000 gallons of fracturing liquid. The amount of polymer employed is usually between about 10 and about 50 pounds thereof per 1000 pounds of sand. The polymer is preferably particulated to a size consisting of a mixture of sizes $-20$ and $+100$. Such a particle size for the polymer is preferable in order that the unswollen particles are of much the same size as that of the particles of propping agent, e.g., sand. When such is true, the polymer particles blend readily with the sand, are uniformly carried into fractures and crevices of the earth in company with the sand, whereby they are readily contacted by encroaching water and brines, become swollen thereby, and plug the fracture to flow of these liquids, in accordance with this invention. Plugging tests similar to those by which the data of Table III were obtained were carried out, and the results showed that particles in the range of between about 20 and 100 mesh were preferred because they showed optimum plugging efficiency. Particles appreciably larger or smaller, or particles of insufficient spread in range of size, although operable, tended to behave less efficiently.

The following treatment for elective plugging of formations in a well to inhibit the intrusion of water is illustrative of the practice of the invention. A west Texas oil well had been treated earlier by shooting with nitroglycerin and then further stimulated by fracturing according to the teachings of U.S. Patent Reissue No. 23,733 using about 5000 gallons of fracturing fluid carrying about 5000 pounds of sand as a propping agent. The production of the well following this treatment was 80 barrels of oil per day and 115 barrels of water per day. Several off-set or near-by wells producing from the same pool averaged about 50 barrels of oil per day and 75 barrels of water per day following the conventional fracturing treatment. At the time of treatment according to this invention, the rate of oil production from the instant well had decreased with use and it was desired to restimulate the well by fracturing.

Because of the substantial water production from the well, there was a real need to carry out the fracturing treatment in such a manner as to increase the production of oil, and to decrease the production of water.

In preparation for the treatment about 1400 pounds of limited cross-linked polymer of about 20 to 100 mesh particle size and like that used in Run No. 7 of Table I, was blended with 40,000 pounds of 20–40 mesh sand. This was done by adding the polymer particles to the sand while the latter was being elevated by a screw conveyor into a temporary storage bin at the well site.

The well being treated had a total depth of 1631 feet and casing had been run to a depth of 1505 feet. The pay zone extended from the bottom of the casing to the total depth of the well. The first operation on the well was to fill the casing and open hole by pumping in crude oil. This was followed by crude oil with the sand-polymer mixture dispersed therein at a concentration of at first of about one pound per gallon (while establishing communication into the formation) and thereafter at a concentration of about two pounds per gallon for the majority of the pumping. A total of about 20,160 gallons of crude oil was employed for this stage, and was followed immediately with about 273 gallons of straight crude oil as a flush to displace the oil-sand-polymer mixture from the casing and well bore into the formation.

A production test of the well immediately following the treatment showed 100 barrels of oil and 175 barrels of water per day. This test was conducted before the polymer had had an opportunity to absorb water, swell, and inhibit encroaching water in accordance with the invention. A test 30 days following the treatment showed that the well was now producing 90 barrels of oil and 45 barrels of water per day showing that the polymer particles had swollen and substantially inhibited the flow of water from the formation.

We claim:

1. The method of fracturing a well penetrating a subterranean formation into which water intrudes which comprises admixing a particulate cross-linked oil insoluble water-insoluble polyacrylamide polymer capable of swelling upon exposure to aqueous media with an oil base liquid, said polymer being used in the ratio of between about 10 and 400 pounds per 1000 gallons of oil base liquid, injecting said oil base liquid-polymer mixture down said well and to said formation at sufficient pressure whereby fractures are created extending into said formation and at sufficient rate whereby said polymer is carried into said fractures, discontinuing injecting said liquid-polymer mixture whereby the polymer is permanently deposited in said fractures and on contacting water the polymer swells impeding movement of water in the fracture.

2. The method according to claim 1 wherein the cross-linked polyacrylamide is produced by copolymerization of acrylamide monomers with 175 to 6000 p.p.m. by weight of N,N'-methylene-bis-acrylamide.

3. The method according to claim 1 wherein the cross-linked polyacrylamide is produced by irradiation of linear polyacrylamide.

4. The method according to claim 1 wherein the cross-linked polyacrylamide polymer has a particle size principally within the 20 to 100 sieve mesh size range.

5. In a method of fracturing a well penetrating a subterranean formation into which water intrudes the improvement which comprises admixing a particulate cross-linked oil-insoluble water-insoluble polyacrylamide polymer which is capable of swelling upon exposure to aqueous media with an oil base liquid and which is produced by copolymerization of acrylamide monomer with 0.035 to 1.75 percent by weight of an aldehyde, said polymer being urged in the ratio of between about 10 and 400 pounds per 1,000 gallons of oil based liquid, injecting said oil base liquid-polymer mixture down said well and to said formation at sufficient pressures whereby fractures are created extending into said formation and at sufficient rate whereby said polymer is carried into said fractures, discontinuing injecting said liquid-polymer mixture whereby the polymer is permanently deposited in said fractures and on contacting water the polymer swells impeding movement of water in the fracture.

References Cited by the Examiner

UNITED STATES PATENTS

| | | | |
|---|---|---|---|
| 2,065,512 | 12/1936 | Cannon | 166—30 |
| 2,801,984 | 8/1957 | Morgan et al. | 166—33 X |
| 2,827,121 | 3/1958 | Nowak | 166—42 X |
| 2,896,717 | 7/1959 | Howard | 166—42 |
| 2,933,135 | 4/1960 | Johnson | 166—42.1 |
| 3,114,419 | 12/1963 | Perry et al. | 166—33 |

ERNEST R. PURSER, *Primary Examiner.*

CHARLES E. O'CONNELL, BENJAMIN HERSH, JACOB L. NACKENOFF, *Examiners.*

T. A. ZALENSKI, S. J. NOVOSAD,
*Assistant Examiners.*